Figure 1:
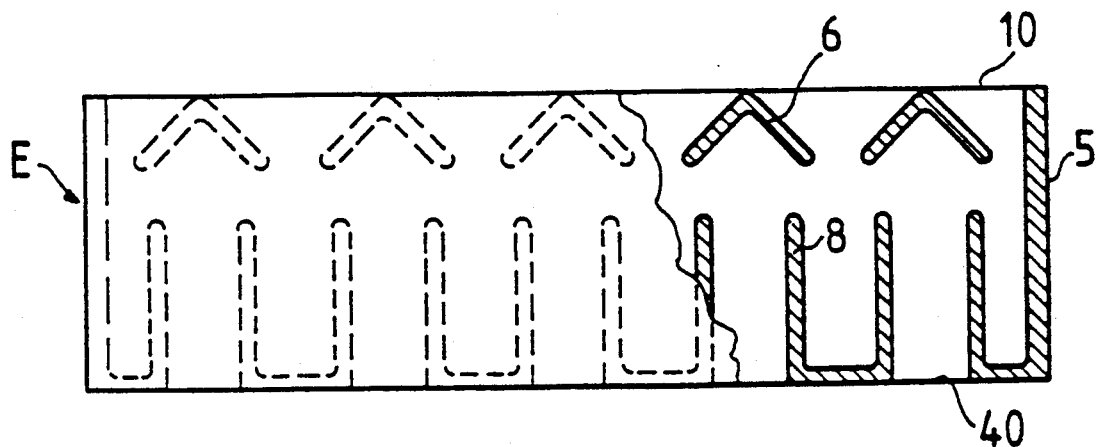

United States Patent [19]
Hasler et al.

[11] Patent Number: 5,187,316
[45] Date of Patent: Feb. 16, 1993

[54] PASSIVE EXPLOSION PROTECTION DEVICE

[75] Inventors: Jürg Hasler, Richterswil; Kurt Stolz, Wädenswil, both of Switzerland

[73] Assignee: Luwa Ltd., Zurich, Switzerland

[21] Appl. No.: 651,770

[22] Filed: Feb. 7, 1991

[30] Foreign Application Priority Data

Dec. 3, 1990 [EP] European Pat. Off. ........... 90123086

[51] Int. Cl.⁵ ............................................. F41H 9/00
[52] U.S. Cl. .................................. 89/36.02; 89/36.04; 109/1 S; 454/194; 454/902
[58] Field of Search ................. 89/36.02, 36.04, 36.08, 89/36.11, 36.12, 36.13, 36.14, 36.15; 52/169.6; 109/1 S; 454/194, 902

[56] References Cited

U.S. PATENT DOCUMENTS

| | | | |
|---|---|---|---|
| 1,899,735 | 2/1933 | McClintock | 89/36.04 |
| 3,129,648 | 4/1964 | Hoff. | |
| 5,009,252 | 4/1991 | Faughn | 137/614.04 |

FOREIGN PATENT DOCUMENTS

| | | | |
|---|---|---|---|
| 28141 | 5/1981 | European Pat. Off. | 52/169.6 |
| 1009033 | 5/1957 | Fed. Rep. of Germany | 109/1 S |
| 1001898 | 7/1957 | Fed. Rep. of Germany. | |
| 1252068 | 8/1967 | Fed. Rep. of Germany. | |
| 1255501 | 11/1967 | Fed. Rep. of Germany. | |
| 1559611 | 9/1969 | Fed. Rep. of Germany | 109/1 S |
| 1708077 | 4/1971 | Fed. Rep. of Germany. | |
| 2492943 | 4/1982 | France | 52/169.6 |
| 449433 | 5/1966 | Switzerland. | |
| 1066237 | 4/1964 | United Kingdom. | |

OTHER PUBLICATIONS

Anet, "Überdruck und Luftstoss", Forschungsinstitut Für Militärische Bautechnik, Zürich, 1975.
Kunz, Binggeli, "Stossrohrprüfungen mit hoheren Druckstossbelastungen aug ESV", Gruppe Fuer Ruestungsdienste, 1982, 1984.
Baker, Tuan, Baker "Passive Airblast Attenuation Valves for Conventional Weapons", Wilfred Baker Engineering, Oct. 1989, pp. 3, 4, 34, 39, 66.

Primary Examiner—Stephen M. Johnson
Attorney, Agent, or Firm—Cushman, Darby & Cushman

[57] ABSTRACT

This invention relates to a passive explosion protection device wherein a quick acting gate valve is designed in combination with means for directing and reflecting incumbent pressure surges to reduce or decelerate the surges prior to contact with the gate valve.

12 Claims, 3 Drawing Sheets

PASSIVE EXPLOSION PROTECTION DEVICE

The invention relates to a passive explosion protection device for the air passage opening in a shelter.

Explosion protection devices in the form of quick-acting gate valves have been known for this purpose for a long time. The closure times of such quick-acting gate valves can be below 5/1000 sec and, moreover, have some constructions which aim to reduce the pressure surge passing through prior to closure. However, nowadays the opinion prevails that, in explosions produced by conventional weapons, prior to closure courses of the pressure increase are to be anticipated, in which critical pressures can occur within such closure times, and in which the reduction of the proportions of the pressure surge passing through, and thus of the corresponding pulse, is inadequate. From theory and trials the idea is known to pursue the reduction or the deceleration of the pressure/pulse without the use of valves. The term "passive air-blast attenuation device" has been coined for such devices.

The object of the invention is the provision of a passive attenuation device or explosion protection device which is effective against short-term pressure surges, has an increasing effect with the rise in pressure during a pressure surge and causes a small drop in pressure during normal ventilation operation.

This object is achieved by the features of the characterizing clause of claim 1.

The reflection chamber aligned towards the entry opening absorbs the majority of a pressure surge which has already partially expanded and brings about its reflection. The higher pressure reflected acts in a decelerating manner on the subsequent pressure surge. The effect of the reflection chamber is reinforced by the channeling influence of the guide elements which are likewise used to produce the reflection pressure. A further reduction takes place in the expansion space which connects the connection chamber to the outlet opening and thus to the shelter. It is also significant that, in the region of the entry zone, the build up of a reflection pressure is largely prevented by the arrangement of the guide elements.

During normal ventilation operation, due to the favorable flow-related design the air in the entry zone undergoes a small acceleration and correspondingly a slight pressure loss. From the connection chamber, the air passes into the expansion chamber without substantial deflection, with the result that any pressure losses occurring here are also comparatively small.

Figure 2:
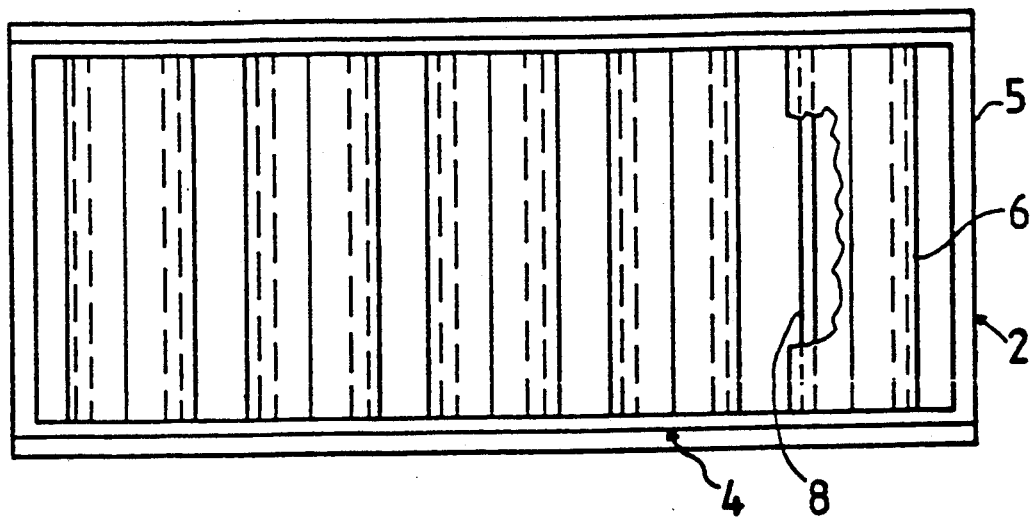
Figure 3:
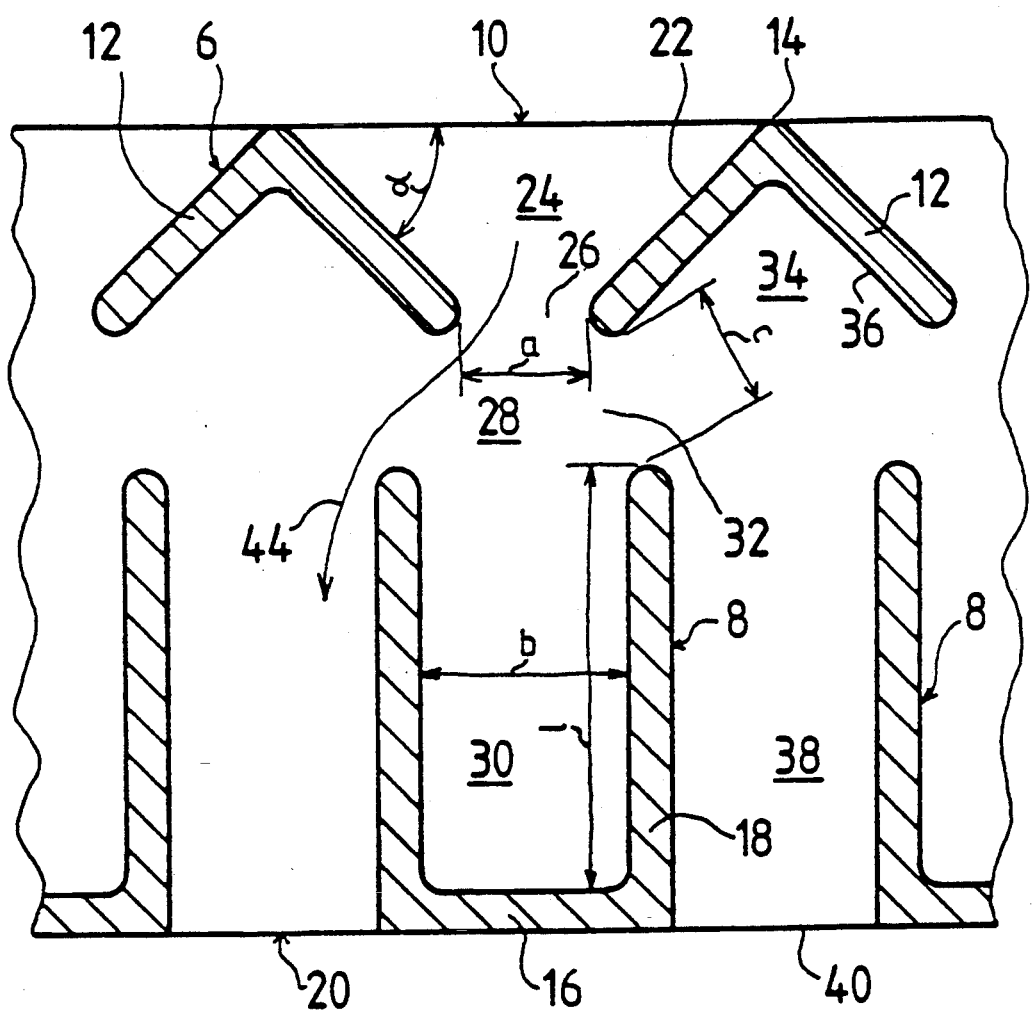
Figure 4:
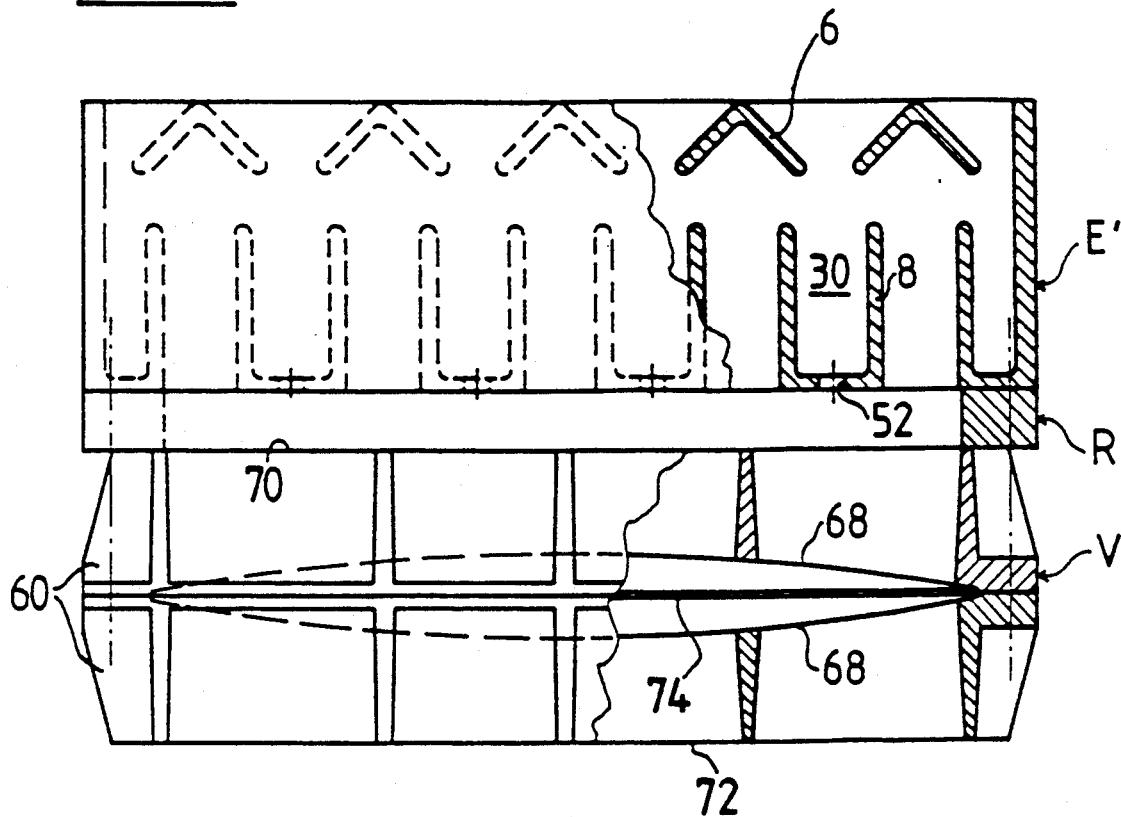
Figure 5:
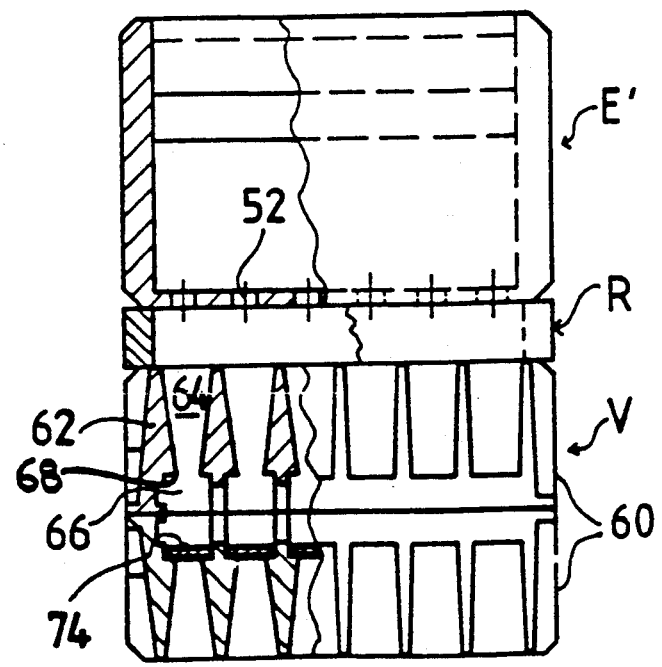

Further details emerge from the subsequent descriptions which explain two exemplary embodiments of the explosion protection device according to the invention with reference to the drawing, in which:

FIG. 1 shows the explosion protection device according to the first embodiment in cross-section, FIG. 2 shows the entry side of the explosion protection device according to FIG. 1 in a front view, FIG. 3 shows an extract from FIG. 1, illustrated on an enlarged scale, FIG. 4 shows a cross-sectional illustration of an explosion protection unit according to the invention consisting of a passive explosion protection device according to the invention in a second embodiment and a known explosion protection valve, and FIG. 5 shows a lateral view of the unit according to FIG. 4, partially in section.

As the illustration according to FIGS. 1, 2 and 3 shows, the explosion protection device E has an elongated rectangular contour determined by a frame 2, which contour will be referred to below with regard to the dimensions. Extending parallel to each other inside the frame 2 transversely to its longitudinal limbs 4 are profiles or elements 6 and 8 which are arranged in two mutually parallel rows. The profiles 6 and 8 are composed of steel and are rigidly connected to the frame 2, which is likewise composed of steel, at its longitudinal limbs 4. The profiles 6, which are arranged adjacent to the entry side of the frame 2 designated as 10, are angle profiles, e.g. having limbs 12 extending at 90° relative to each other. The profiles 6 have a peak 14 which faces the entry side 10, and the two limbs 12 enclose angles $\alpha$ of equal size with this entry side, i.e. in the present case angles of 45° in each case. The profiles 8 have a U-shape and have a web 16 which extends in alignment with an outlet side 20 of the frame 2. The limbs 18, which are straight in the exemplary embodiment illustrated and extend parallel to each other, are connected to the web 16 at an angle of 90°. It should be added that the profiles 6 and 8 are arranged evenly distributed over the length of the frame 2. However, these profiles are offset in relation to one another in such a way that, as is visible in FIG. 2, the peak 14 of a profile 6, seen in a plan view, lies between the limbs 18 of two adjacent profiles 8.

Seen from a functional viewpoint, the limbs 12 form guide surfaces 22 which face the entry side 10, laterally bound an entry zone 24 formed between two adjacent profiles 6 and are upstream of a slot-shaped entry opening 26. Adjoining the entry opening 26, which has the width a, is a connection chamber 28 which is widened in width. Opposite the entry opening 26, the connection chamber 28 opens out into an elongated reflection chamber 30. As is visible, each reflection chamber 30 is bounded in the width b by the limbs 18 and in the length l by the web 16 of a profile 8. The width a of the entry opening 26 is smaller than the width b of the reflection chamber 30 which is aligned symmetrically to said opening. Two lateral passage openings 32, which are each bounded between a limb 18 of the profile 8 and a limb 12 of the profile 6 and have the width c, likewise adjoin the connection chamber 28 and lead into an expansion space 34. Each expansion space 34 is bounded by the inside surfaces 36 of the limbs 12 of a profile 6 and opens out into an outlet channel 38. The limbs 18 of adjacent profiles 8 bound the outlet channel 38 in its width, the latter ending in an outlet opening 40 situated at the outlet side 20 of the frame. Due to the parallel arrangement of the profile 6 and 8 in relation to each other and to the transverse limbs 5 of the frame 2, the cross-sections of the zones 24, chambers 28 and 30 and the expansion spaces 34 are constant over their entire length.

Now the explosion protection device described shall be considered in the case of an explosion and in normal ventilation operation. For the ventilation operation, it is assumed that the explosion protection device is arranged at the entry of an air supply channel for a shelter and is in connection with a ventilator arranged on the shelter side.

On the occurrence of a pressure wave at the entry side 10 of the explosion protection device, the surge in the entry zone 24 is channeled towards the entry opening 26. A first expansion takes place in the connection chamber 28, the majority of the channeled surge entering the reflection chamber 30. The reflection which takes place both on the web 16 and on the limbs 18 reflects with increased pressure back into the connection chamber 28. Part of the reflection is thereby directed towards the entry opening 26 and there as well as in the entry zone 24 it brings about a deceleration of the subsequent pressure likewise arriving there. In the meantime, insofar as parts of the surge have passed via the passage opening 32 into the expansion space 34, a deceleration of the subsequent pressure is effected at the passage opening due to the deflection on the inside surfaces 36 of the limbs 12 and the resulting eddying. The remaining pressure/pulse can then only act via the outlet channel 38 in the direction of the shelter under further reduction due to expansion.

Due to the arrow-shaped design of the profiles 6 towards the entry side 10, a reflection of pressure waves is then also largely prevented if the latter arrive at acute angles relative to the entry side 10. The profiles 6 also form an effective shatter protection.

During ventilation operation, there is an intake of outside air from the surroundings of the explosion protection device. The flow which is formed undergoes a small acceleration when it passes through the entry zone 24 by virtue of the arrangement of the guide elements 22 at the angle α and the gradual constriction of the cross-section thus caused. Correspondingly, the flow reaches the connection chamber 28 with a small pressure loss. Partial flows which are formed in said connection chamber extend through the two adjacent passage openings 32 and pass by the respective expansion space 34 virtually directly into the associated outlet channel 38. Here too, the flow undergoes a relatively small deflection as is indicated by the arrow 44 in FIG. 3. In this case too, the pressure loss is consequently kept within acceptable limits.

The essential factor is that the flow during ventilation operation does not have to follow that path, along which a pressure surge is forced.

The angle α could also have a larger or smaller value than that specified. A course other than a right-angled course of the limbs 18 relative to the webs 16 is likewise conceivable and possible.

Since the explosion protection device has no movable parts, it can be manufactured without assembly and adjustment work. In comparison with explosion protection valves, the effectiveness against pressure surges with a steep leading edge helps to improve the protection.

The explosion protection device according to the invention can be used together with a quick-acting gate valve. An advantageous development of the explosion protection device in an explosion protection unit which comprises such a valve is illustrated in FIGS. 4 and 5.

The explosion protection unit shown comprises an explosion protection device E', which is rectangular in plan view, and a quick-acting gate valve V which is connected to said explosion protection device and has the same size and shape. Quick-acting gate valves of this type are known for example from CH-A 449433. Since the device E' largely corresponds to the explosion protection device E according to FIGS. 1–3, the same parts of the latter are given the reference symbols used in said Figures. It should be noted that, deviating from the device E, the device E' has at least one opening 52 in each web 16, the outlet side 20, on which these webs lie, facing the valve V. The valve V comprises two seat parts 60 which are arranged opposite each other and are rigidly connected to each other in a manner not illustrated. The seat parts 60 each have a multiplicity of webs 62 which form between them channels 64, passage openings 66 and seat surfaces 68. The passage openings 66 and the seat surfaces 68 of the two seat parts bounding said passage openings are arranged opposite one another. For each passage opening 66, a closure element 74 constructed as a leaf spring is held movably between the seat parts 60 in a position aligned with the seat surfaces 68. This closure element is illustrated in FIG. 4 in its neutral open position, whereas FIG. 5 shows said closure element in a closed position. The end face 70 of the valve V faces the outlet side 20 of the device E'. The air outlet of the explosion protection unit is situated at the end face 72. The device E' is rigidly connected to the valve V via a frame R.

It emerges from the above text in relation to the closure elements 74 that each of the openings 52, connected to one of these elements, is connected to the associated entry opening 26 on a shorter path than the corresponding outlet opening 40 of the device E'.

If, in the case of an explosion, a pressure surge reaches the explosion protection unit, said pressure surge firstly acts, as described above, in the reflection chamber 30. Through the openings 52 in the webs 16 bounding the reflection chamber, a partial pressure acts directly in the channels 64 and there charges the closure elements 74. Even before the pressure surge of a reduced size has passed through the outlet channels 38 at the valve V, the closure elements 74 are consequently placed against the corresponding seat surfaces 68 in the sense of a pilot control. The passage openings 66 are consequently closed when the main pressure/pulse acts in the channels 64 adjoining the entry side 70. This thus makes an appreciable pressure rise in the shelter impossible in any case.

In the case of ventilation operation, the openings 52 permit part of the quantity of air taken in to follow a straight flow path from the entry opening 26 of the device E' into the valve V, which is open in this case, by which means a detectable decrease in the still existing pressure losses occurs. It is therefore advantageous to provide such openings even in an explosion protection device according to FIGS. 1 to 3.

Instead of steel which is also primarily considered as the material for all the parts of the quick-acting gate valve, the latter can be produced, as can the explosion protection device too, from other metallic construction materials including an aluminum alloy.

We claim:

1. A passive explosion protection device for air passing in a shelter, comprising:
    an inlet having a slot-shaped entry opening, and an outlet opening for connection to said shelter, said air flow being directed from said inlet to said outlet opening, said slot-shaped entry opening being disposed between two parallel metallic profile elements, said entry opening connecting with a connection chamber, said profile elements forming guide surfaces of an entry zone disposed before said entry opening, said guide surfaces being arranged in the direction of flow; and
    an elongated reflection chamber adjoining said connection chamber, said reflection chamber having a single shorter open side and opposed longer closed sides with the single open side confronting said entry opening, said connecting chamber being continuously connected via a lateral passage with an expansion space, and said expansion space being connected to said outlet opening.

2. The explosion protection device as claimed in claim 1, further comprising mutual parallel first and second rows of said profile elements, wherein said entry opening is formed between each adjacent profile element of said first row thus forming said guide surface, said reflection chamber formed by each profile element of said second row.

3. The explosion protection device as claimed in claim 2, wherein said profile elements forming said guide surfaces are angled profiles having a peak facing said inlet and said profile elements of said second row forming said reflection chamber defined as U-shaped profiles which open towards said entry opening of said inlet.

4. The explosion protection device as claimed in claim 2, wherein said profile elements are disposed in an elongated frame, and rigidly connected thereto.

5. A passive explosion protection device for air passing in a shelter, comprising:
an inlet having a slot-shaped entry opening, and an outlet opening for connection to said shelter, said air flow being directed from said inlet to said outlet opening, said slot-shaped entry opening being disposed between two parallel metallic profile elements, said entry opening connecting with a connection chamber, said profile elements forming guide surfaces of an entry zone disposed before said entry opening, said guide surfaces being arranged in the direction of flow; and
an elongated reflection chamber adjoining said connection chamber, said reflection chamber having an opening confronting said entry opening, said connecting chamber being connected via a lateral passage continuously connecting with an expansion space, and said expansion space being connected to said outlet opening, said reflecting chamber including a control opening for a quick-acting gate valve being connected to said device at said outlet opening.

6. The explosion protection device as claimed in claim 5, further comprising mutual parallel first and second rows of said profile elements, wherein said entry opening is formed between each adjacent profile element of said first row thus forming said guide surface, said reflection chamber formed by each profile element of said second row.

7. The explosion protection device as claimed in claim 6, wherein said profile elements forming said guide surfaces are angled profiles having a peak facing said inlet and said profile elements of said second row forming said reflection chamber defined as U-shaped profiles which open towards said entry opening of said inlet.

8. The explosion protection device as claimed in claim 6 wherein said profile elements are disposed in an elongated frame, and rigidly connected thereto.

9. A passive explosion protection device for an air exchange channel of a shelter structure, comprising:
an elongated frame defining an open front side and an open rear side and having a pair of longitudinal limbs extending in spaced apart relation;
first and second rows of mutually parallel profile elements arranged within said frame; said second row extending parallel to an immediately adjacent said first row, both of said first and second rows extending along the longitudinal limbs of said frame, each of the profile elements of said first and second rows extending transversely to said longitudinal limbs and being rigidly connected therewith, the profile elements in each of said first and second rows being evenly distributed along said longitudinal limbs, the profile elements of the second row being offset with respect to the profile elements in the first row in the direction of extension of said longitudinal limbs;
an entry opening formed between adjacent profile elements of said first row directed toward the open front side of said frame;
an outlet opening formed between adjacent profile elements of said second row directed toward said rear side of said frame,
each profile element of said first row having an apex and guide surfaces exposed to the open front side of said frame,
each profile element of said second row forming a reflection chamber having an elongated cross section and a single shorter open side and opposed longer closed sides with the single open side confronting a respective one of said entry openings;
an outlet channel of elongated cross section being delimited by said opposed longer closed sides of each two adjacent profile elements and having two ends with one end of the outlet channel facing a profile element of said first row and the other end of the outlet channel coinciding with said outlet opening, each outlet channel being in connection with said reflection chambers of adjacent profile elements of said second row.

10. An explosion protection device for air passing in a shelter, comprising:
an inlet having a slot-shaped entry opening, and an outlet opening, said air flow being directed from said inlet to said outlet opening, said slot-shaped entry opening being disposed between two parallel metallic profile elements, said entry opening opening into a connection chamber, said profile elements forming guide surfaces of an entry zone disposed before said entry opening, said guide surfaces being arranged in the direction of flow;
an elongated reflection chamber adjoining said connection chamber, said reflection chamber having an opening confronting said entry opening, said connecting chamber being connected via a lateral passage opening to an expansion space, said expansion space being connected to said outlet opening;
a quick-acting gate valve having first and second ends, said first end being connected to said outlet opening, said second end being connected to said shelter, said reflecting chamber including a control opening for pilot control of said gate valve.

11. A passive explosion protection device for air passing in a shelter, comprising:
an inlet having a slot-shaped entry opening, and an outlet opening for connection to said shelter, said air flow being directed from said inlet to said outlet opening, said slot-shaped entry opening being disposed between two parallel metallic profile elements, said entry opening connecting with a connection chamber, said profile elements forming guide surfaces of an entry zone disposed before said entry opening, said guide surfaces being arranged in the direction of flow;

an elongated reflection chamber adjoining said connection chamber, said reflection chamber having a single shorter open side and opposed longer closed sides with the single open ends confronting said entry opening, said connecting chamber being continuously connected via a lateral passage opening to an expansion space, and said expansion space being connected to said outlet opening, said profile elements including mutually parallel first and second rows, said entry opening being formed between each adjacent profile element of said first row thus forming said guide surface, said reflection chamber being formed by each profile element of said second row, said profile elements of said first and second rows being disposed in an elongated frame, and rigidly connected thereto; and an outlet channel of elongated cross section being delimited by said opposed longer closed sides of each two adjacent profile elements and having two ends with one end of the outlet channel facing a profile element of said first row and the other end of the outlet channel coinciding with said outlet opening, each outlet channel being in connection with said reflection chambers of adjacent profile elements of said second row.

12. The explosion protection device as claimed in claim 11, wherein said profile elements forming said guide surfaces are angled profiles having a peak facing said inlet and said profile elements of said second row forming said reflection chamber defined as U-shaped profiles which open towards said entry opening of said inlet.

* * * * *